March 7, 1933.      J. D. WALLACE      1,900,082
HIGH FREQUENCY MEASURING APPARATUS
Filed March 13, 1931
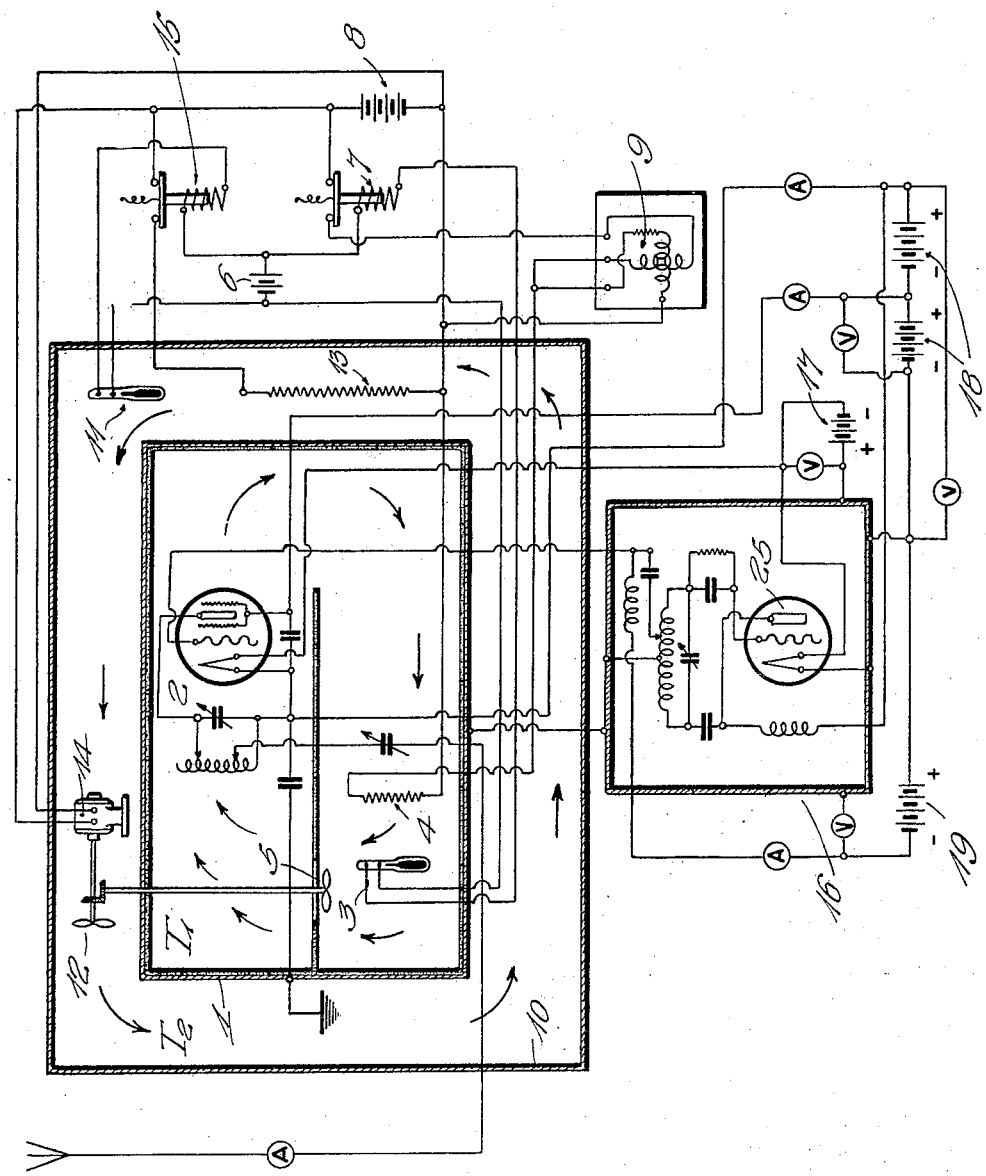
INVENTOR.
James D. Wallace,
BY
ATTORNEY.

Patented Mar. 7, 1933

1,900,082

UNITED STATES PATENT OFFICE

JAMES D. WALLACE, OF WASHINGTON, DISTRICT OF COLUMBIA

HIGH FREQUENCY MEASURING APPARATUS

Application filed March 13, 1931. Serial No. 522,437.

My invention relates broadly to high frequency signaling and more particularly to a method and apparatus for determining the power output of radio transmitters and determining the efficiency thereof.

The object of my invention is to provide an arrangement of apparatus for measuring radio frequency power in an antenna circuit at high frequencies and determining the plate circuit efficiency of high frequency amplifiers employed in signal transmitters.

The principles of my invention will be understood from the following specification by reference to the accompanying drawing which diagrammatically shows the apparatus of my invention.

Referring to the drawing in detail, reference character 1 designates a chamber containing an amplifier and its associated circuit 2; a thermostat 3; a heating resistor 4; and a fan 5 to establish air circulation within the compartment 1. The thermostat 3 by means of battery 6 operates the relay 7 which connects and disconnects the battery 8 from heater 4 in such manner as to keep compartment 1 at a constant temperature $T_1$. The watt meter 9 is connected so that the number of watts flowing into resistor 4 may be determined, when the heater is energized. The walls of compartment 1 are made of two substances, one to serve as a radio frequency shield and another to serve as a heat insulator. In the particular equipment used, the walls are composed of aluminum and pressboard.

Compartment 10 in the drawing contains a thermostat 11, a fan 12, a heating resistor 13 and a motor 14 for driving both fans 5 and 12, thereby obtaining air circulation in both compartments 1 and 10. The thermostat 11 by means of battery 6 operates the relay 15 which connects and disconnects battery 8 from heater 13 in such manner as to keep compartment 10 at a constant temperature $T_2$. However, to properly operate this measuring device, the temperature of $T_2$ must be lower than $T_1$. The walls used for compartment 10 are made of celotex and wood, however, any other heat insulating sheet material may be used. Now since compartment 1 is maintained at a higher temperature than compartment 10, there will be a constant flow of heat from the inner to the outer compartment. Instead of measuring this quantity of heat in calories per second, it may be measured in terms of the average number of watts input required to keep compartment 1 at the proper temperature. The average power input may be determined in this way. It is observed that power is applied to heater 4 only at intervals and not continuously because of the action of the thermostat. From watt meter 9 determine the number of watts flowing into heater 4 when the power is "on". Next take two stop watches. With one stop watch measure the total time of a certain number of periods of "on" and "off" of heater 4. During this same period, with the other stop watch measure the length of times that heater 4 was "on" and add them to find the total time "on". Next divide the total time "on" by the total length of time of the selected number of periods "off" and "on", thereby obtaining the percentage of the time that heater 4 stays "on". Then multiply this percentage by the number of watts flowing when the heater is "on", thereby determining the average power required to keep compartment 1 at the temperature $T_1$, when compartment 10 is at $T_2$.

Compartment 16 contains a master oscillator circuit 25 for exciting the amplifier 2 in compartment 1. Compartment 16 is enclosed in an aluminum box to prevent any feed-back from the antenna. The filament of the amplifier and master oscillator tubes 2 and 25 are supplied from the battery 17. The plate supply for the master oscillator 25 is supplied by battery 18. The plate and shield grid supply for the amplifier 2 is also supplied from battery 18. The negative grid bias for the amplifier is supplied from the battery 19.

The demand and necessity for such an equipment will be understood when the results which my apparatus produces are considered in the study of various types of antennas and amplifier circuits. At the lower frequencies, (below 2000 kilocycles) power is usually applied to an antenna by inserting a loading coil of proper inductance in the antenna circuit, so that the entire circuit may be resonated at the frequency at which transmission is desired. Under this resonant condition, the antenna impedance is resistance only and can be measured by any one of the many methods already suggested for measurement of alternating current resistance of circuits containing no reactive components. However, any method which works satisfactorily only when the antenna is a non-reactive circuit will be worthless when the antenna circuit is reactive, as it usually is under actual operating conditions at frequencies higher than 2000 kilocycles. Also it is difficult to obtain standards of radio frequency resistance to be incorporated within an antenna measuring instrument which are reliable at frequencies higher than 2000 kilocycles. The method of my invention overcomes both of these difficulties.

A measurement of antenna power is taken in this manner. Apply proper filament voltage to the amplifier 2, removing plate voltage, shield grid voltage, grid bias, and control grid excitation. With the watt meter 9 and two stop watches, determine as explained hereinbefore the average power supplied to heater 4 which is required to keep the inner compartment at the proper temperature with the normal filament voltage applied. This average power input to resistor or heater 4 will hereinafter be referred to as $P_1$. Next apply amplifier grid bias voltage, plate voltage, shield grid voltage, and excitation applied to the control grid. Then tune the amplifier and antenna circuit to operate as a transmitter. The plate power to the amplifier may be determined by the voltmeter and ammeter in the plate circuit. Let this power be designated as $P_2$. Now power $P_2$ will be dissipated in two ways; part of it will be expended in heating the plate of the amplifier and in amplifier plate circuit losses, and the other part in the antenna 20. Let the part expended inside the inner compartment be designated as $P_3$, and the part expended in the antenna as $P_4$. Obviously, this equation is true:

$$P_2 = P_3 + P_4 \qquad (1)$$

Power is also applied to the shield grid of the amplifier, and all is expended in the form of heat. Let the shield grid power hereinafter be designated as $P_5$. It may be determined from the voltmeter and the ammeter in the shield grid circuit. There is one other source of power input to the inner compartment. The excitation voltage applied to the control grid in most cases, has higher peak values of voltage than the bias applied. The result is that there is a rectified component of grid current between the grid and the filament. Power must be expended in moving the electrons from the amplifier filament to the control grid, and this power is dissipated in heating the control grid of the amplifier. The power expended in the grid circuit of an amplifier is proportional to the 1.34th power of the rectified grid current. Let this power hereinafter be called $P_6$. Then this equation holds true:

$$P_6 = KI^{1.34}$$

where $I$ = rectified grid current $\qquad (2)$
$K$ = constant which depends upon the tube.

Since the constant K has been determined for a large number of tubes, and the current may be determined from the rectified grid current instrument, the power $P_6$ may be readily calculated. The temperature difference of inner compartment above the outer compartment must be fixed so that the powers $P_3$, $P_5$ and $P_6$ are not enough to hold the inner compartment at its proper temperature. Then the thermostat will provide a certain average power input through resistor 4 to keep the temperature constant. This power supplied through resistor 4 under the control conditions specified will be called $P_7$ and may be determined by the watt meter 9 and the two stop watches as explained hereinbefore. Now, since the average power input from all sources to the inner compartment is the same at all times, the following equation holds true:

$$P_1 = P_3 + P_5 + P_6 + P_7 \qquad (3)$$

The equation may be rearranged in this manner:

$$P_3 = P_1 - P_5 - P_6 - P_7 \qquad (4)$$

All terms on the right hand side may be measured or calculated, and therefore $P_3$ the plate power expended in the inner compartment may be evaluated. Now Equation (1) rearranged may be written in this manner:

$$P_4 = P_2 - P_3$$

In the above expression $P_3$ has already been determined, and $P_2$ may be determined from instrument readings. The term $P_4$ is the antenna power which may be thereby determined. This device is very useful for determining power output of a transmitter, for studying the effectiveness of various radiating devices, for determining the efficiency of various types of plate circuits, for determining the proper amount of coupling to utilize, and for the determination of any other factors affecting the efficiency of a radio transmitter.

If the effective resistance of the antenna at any point is required, it may be found by dividing the radio frequency power by the square of the current at that point. The overall plate efficiency of any amplifier may be determined by dividing the antenna power by the plate input power.

There are two other ways in which the device may be used. The thermostat may be eliminated from the inner compartment and the temperature rise of the inner compartment for a given power input may be measured. Then a calibration curve might be drawn therefrom. When the amplifier is in operation, the temperature rise might be noted and the losses determined therefrom. The device might also be used in this manner: The thermostat may be eliminated, and a steady power put through resistor 4, the amplifier being "off". Note the temperature of the inner compartment under this condition. Next put the amplifier on and reduce the steady power input to resistor 4 until the inner compartment has the same noted temperature. These two methods are not to be preferred to the method I have described previously.

The general method of measurement set forth herein is useful in measuring the losses in any device, provided all losses appear as heat or in any form which can not escape from the inner compartment. Any desired device may be substituted for the amplifier in the inner compartment and by illustrating my invention in connection with an amplifier I do not intend that any limitations shall be imposed upon my invention.

I have found the measuring apparatus of my invention highly accurate in the measurement of high frequency power. The system has been found to be the only practical method of measuring power at frequencies higher than 2000 kilocycles. While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. The method of measuring power in a reactive antenna circuit which consists in operating a power amplifier into the antenna circuit, determining the power required to maintain the parts of the power amplifier at constant operating temperature, measuring the heat loss and determining therefrom the power transferred from said amplifier to the antenna circuit.

2. The method of measuring power in a reactive antenna circuit which consists in operating a power amplifier into the antenna circuit, determining the average plate power and the power dissipated in losses in the plate circuit of the power amplifier and other losses in said amplifier as represented by dissipated heat and determining therefrom the power transferred by said amplifier to said antenna circuit.

3. The method of measuring power in a reactive antenna circuit which consists in operating a power amplifier into the antenna circuit and determining the value of plate power and the value of power dissipated in heating the plate and the plate circuit losses, determining the other losses in said amplifier, and subtracting the value representing all of said losses from the first mentioned value to determine the power delivered to the antenna circuit by said amplifier.

4. The method of measuring power in a reactive antenna circuit which consists in operating a power amplifier into the antenna circuit, measuring the plate power of the amplifier, determining the value of the total power dissipated in heating the plate and the power dissipated in plate circuit losses determining the other losses in said amplifier and solving the following equation:

$$P_4 = P_2 - P_3$$

where $P_2$ equals the plate power consumed by the amplifier and $P_3$ equals the power dissipated in heating the plate the plate circuit losses and the other losses in the amplifier for thus determining the power transferred to said antenna circuit from said amplifier.

5. The method of measuring the power in a high frequency antenna circuit which consists in operating a power amplifier into the antenna circuit, determining the value of plate power consumed by the power amplifier and thermally determining the value of the power dissipated in heating the plate, the plate circuit losses and the other losses in the amplifier and subtracting the total sum representing second value from the first value for determining the power transferred from said amplifier to said antenna circuit.

6. A method of measuring the power in an antenna circuit at high frequency which consists in operating a power amplifier into an antenna circuit, enclosing the power amplifier within a temperature controlled cabinet, maintaining the amplifier at constant operating temperature, measuring the total power dissipated in heat by said amplifier under operating conditions, and determining the high frequency power in the antenna circuit by subtracting the integrated value of the power dissipated in heating the plate, the plate circuit losses and other losses from the value of plate power.

7. In an apparatus for measuring high frequency power in electrical circuits, a high frequency load circuit, a plurality of nested compartments, a power amplifier disposed in a central compartment and connected with said high frequency load circuit, means for establishing convection air currents within each of the compartments, heating means in each compartment, thermostats in each compartment for controlling the operation of the heating means therein, and means for determining the amount of thermal energy transferred between said compartments for determining the power transferred from said power amplifier to said load circuit.

8. In an apparatus for measuring power in high frequency circuits, a radio frequency load circuit, a power amplifier circuit for delivering radio frequency power to said radio frequency load circuit, a pair of enclosing chambers, said power amplifier disposed centrally within one of said chambers, means for intermittently heating each of said chambers, thermostats in each of said chambers for controlling said means, means for operating said amplifier into said radio frequency load circuit, and means for measuring the heat transferred between said chambers for determining the power transferred to said radio frequency load circuit.

9. In an apparatus for measuring power in radio frequency circuits, the combination with a high frequency transmission circuit of a pair of enclosing chambers, a power amplifier disposed within one of said chambers and connected with said radio frequency transmission circuit, means for heating each of said chambers, thermostats in each of said chambers for controlling the operation of said heating means and maintaining constant the respective temperatures of each of said chambers, means in one of said chambers for circulating the air within each of said chambers, and means for measuring the heat energy dissipated in said chamber containing said power amplifier from sources other than said means for heating said power amplifier chamber.

10. In an apparatus for measuring power in a radio frequency circuit, the combination with a high frequency transmission circuit of a pair of enclosing chambers, a power amplifier disposed within one of said chambers and connected with said radio frequency transmission circuit, means for heating each of said chambers, thermostats in each of said chambers for controlling the operation of said heating means, said thermostats operating to maintain said chambers at different temperatures and means for measuring the transfer of heat from one chamber to another during the operation of said amplifier for determining the power transferred to said radio frequency circuit from said power amplifier.

11. In an apparatus for measuring power in radio frequency circuits, the combination with a high frequency transmission circuit of a pair of enclosing chambers, the one surrounding the other, a power amplifier disposed within the inner said chambers and connected with said radio frequency transmission circuit, means for heating each of said chambers, thermostats in each of said chambers for controlling the operation of said heating means and maintaining constant the respective temperatures of each of said chambers, said thermostats operating to maintain the outer chamber at a lower temperature than the inner chamber, and means for measuring the heat energy dissipated in said chamber containing said power amplifier from sources other than said means for heating said power amplifier chamber.

12. In an apparatus for measuring power in high frequency circuits, in combination with a high frequency current consuming circuit, a pair of nested chambers, a power amplifier disposed in the inner chamber, means for intermittently heating each of said chambers, means for maintaining the temperature within each of said chambers constant and at predetermined, different values, means for operating said power amplifier into said high frequency current consuming circuit, and means for determining the value of power dissipated in the transfer of thermal energy between said inner and outer chambers while maintaining said power amplifier at a uniform operating temperature.

13. In an apparatus for measuring power consumed in a high frequency circuit, a pair of spacially related inner and outer compartments, a power amplifier disposed in the inner compartment, means for maintaining each of said compartments at different predetermined fixed temperatures, means for operating said power amplifier into said high frequency circuit, and means for measuring the thermal energy transferred from said inner to said outer compartment under operating conditions of said power amplifier for determining the power transferred from said power amplifier to said high frequency circuit.

14. In an apparatus for measuring power consumed in a high frequency circuit, a pair of spacially related inner and outer compartments, a power amplifier disposed in the inner compartment, means for maintaining said inner compartment at a selected constant temperature, means for maintaining said outer compartment at a lower constant temperature, means for operating said power amplifier into said high frequency circuit, and means for measuring the power dissipated by the transfer of heat from said inner to said outer compartments.

15. In an apparatus for measuring power in a high frequency circuit, a high frequency load circuit, a pair of chambers the one surrounding the other, a power tube amplifier having cathode, grid and plate electrodes disposed in the inner chamber and having its output connected to said load circuit, independent means for heating each of said chambers, independent control means for each of said chambers for controlling the operation of each of said last mentioned heating means for maintaining said chambers respectively at constant temperatures, said inner chamber being maintained at a higher temperature than said outer chamber, means for measuring the average power input to said heating means in said inner compartment under different load conditions, and means for determining the electrical energy dissipated by the grid and plate electrodes of said power amplifier.

JAMES D. WALLACE.